United States Patent [19]
Hanacek et al.

[11] 4,443,969
[45] Apr. 24, 1984

[54] MUSHROOM CASING COMPOSITION AND PROCESS

[75] Inventors: William A. Hanacek, Salinas; James E. Kahl, Scotts Valley; Angus B. Mackenzie, Salinas, all of Calif.

[73] Assignee: Castle & Cooke, Inc., San Francisco, Calif.

[21] Appl. No.: 368,181

[22] Filed: Apr. 14, 1982

Related U.S. Application Data

[62] Division of Ser. No. 141,460, Apr. 18, 1980, Pat. No. 4,337,594.

[51] Int. Cl.³ ............................................. A01G 1/04
[52] U.S. Cl. ......................................... 47/1.1; 71/5
[58] Field of Search ...................... 47/1.1, 58, DIG. 7; 71/5

[56] References Cited

U.S. PATENT DOCUMENTS 4,337,594 7/1982 Hanacek et al. .................... 47/1.1 X

FOREIGN PATENT DOCUMENTS 51-96456 8/1976 Japan ..................................... 47/1.1
53-98251 8/1978 Japan ..................................... 47/1.1

Primary Examiner—Robert E. Bagwill
Attorney, Agent, or Firm—Townsend and Townsend

[57] ABSTRACT

In the cultivation of mushrooms from an underlying bed containing mushroom spores, novel compositions and processes are provided for a casing layer which is placed over the compost layer containing spawning mycelium. A hydrophilic, thermosetting prepolymer resin is mixed in with a casing substrate, preferably Canadian peat, other optional additives and sufficient amount of water to form a slurry and the mixture is allowed to cure to a spongy block. The cured material is then pulverized and deposited as a casing layer over the compost layer. Because of the high water retention qualities of this material, watering the mushroom beds is reduced by a factor of three or more, thereby reducing operation and production costs, as also the incidence and severity of disease and displeasing blemishes.

17 Claims, 5 Drawing Figures

U.S. Patent  Apr. 24, 1984  4,443,969
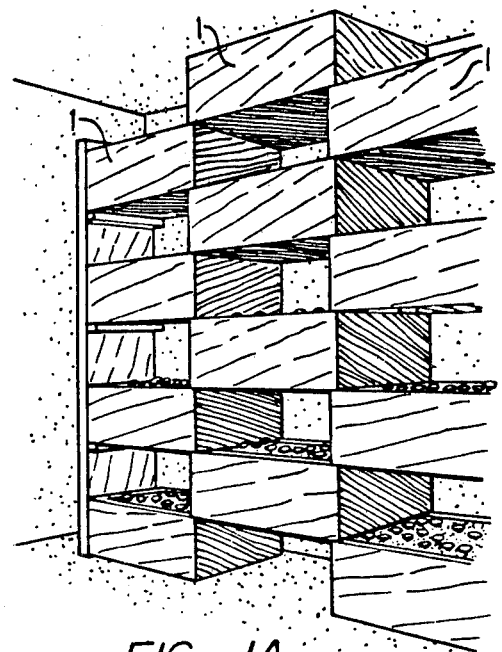
FIG._1A.
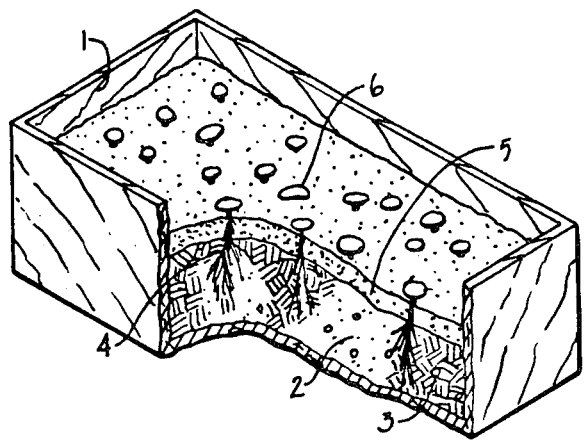
FIG._1B.
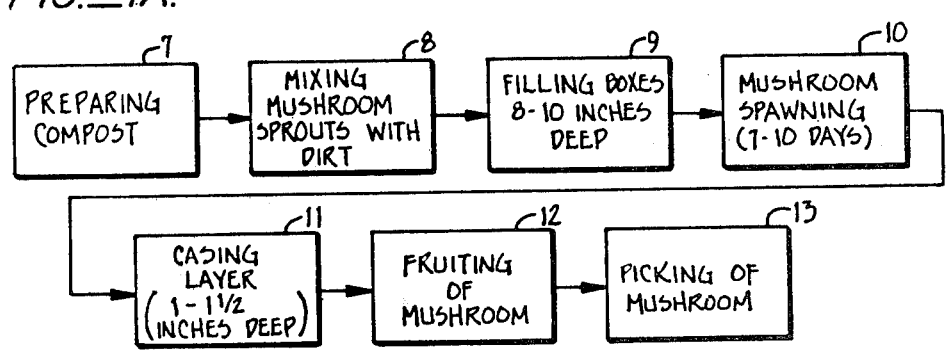
FIG._2.
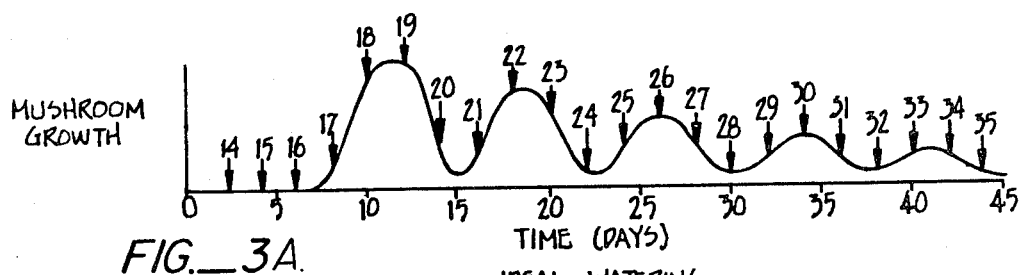
FIG._3A.
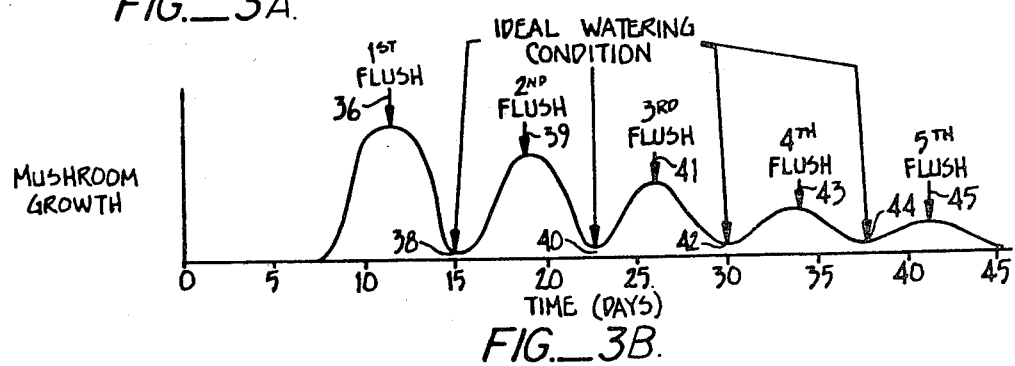
FIG._3B.

MUSHROOM CASING COMPOSITION AND PROCESS

This is a request for filing a application under 37 CFR 1.60 Divisional of pending prior application Ser. No. 141,460, filed on Apr. 18 of 1980 now U.S. Pat. No. 4,337,594.

FIELD OF THE INVENTION

The subject invention relates generally to the cultivation of mushrooms. More specifically, it deals with novel compositions and processes for what is called "casing" or "capping" material used in the cultivation of mushrooms. Casing or capping is the operation of covering mushroom growth beds with a thin layer of soil, peat or a combination thereof.

BACKGROUND OF THE INVENTION

Mushrooms have been esteemed for their great nutritional value and as a culinary delicacy for several thousand years. As a result, mushroom cultivation has become a mammoth international industry. Although improvements in agricultural and environment techniques have greatly enhanced mushroom quality over the past several years, mushroom cultivation is still riddled with unsolved problems. Fresh mushrooms are still subject to a wide variety of defects, susceptible to a wide variety of fungus diseases, and still develop displeasing blemishes. As with any agricultural product, mushroom quality and condition are dependent upon environmental conditions such as air quality, soil moisture, pH, temperature, humidity, $CO_2$ level, and composting and soil conditions. Carefully regulated control of the above factors, coupled with improved materials, methods, carefully planned compost supplementation programs, on-farm protective measures, sanitation and disinfecting programs are a few of the steps being taken during the filling, spawning and casing stages to protect the mushroom crop from blemishes and disease and to ensure higher marketable qualities.

The mushroom is a fungus and its asexual seed is termed a "spore". When these spores germinate within the growing medium and ultimately produce fruit (the mushroom), rootlike threads (or "hyphae") develop from the spores to search for nutrients, absorb them and transmit them to the mushroom. In a multitude of branchings and criss-crossings, these hyphae fuse together and the fused mass is known as the "mycelium". In mushroom growers' parlance, the mycelium is termed the "spawn." It is from the spawn that the mushroom develops.

Mushrooms, typically, are grown in discrete, dark houses, in large, flat wooden beds stacked 8 to 10 feet high and about 2 feet apart. These mushroom houses are maintained under carefully controlled environmental conditions. The beds are prepared by filling them to a depth of about 6 to 10 inches, with a carefully formulated compost composition well known to those skilled in the art, usually consisting of composted straw, animal excreta, and soil, preferably composted wheat straw and horse manure. Due to the shortage of horse manure, other types of animal manure and synthetic compost and fertilizers are now being used in the industry. The mushroom spores are either mixed in with the compost prior to filling the beds or are implanted as spawn in the compost after filling the beds. The compost must not be too moist as otherwise the spawn is killed by excessive moisture.

About 7 to 10 days after the beds have been spawned and the spawn is spreading in all directions, the beds are ready for "casing" or "capping". A casing layer is very important to ensure a good healthy crop of mushrooms. The casing acts as a support for the heavy mushroom caps so that they do not fall over and break the delicate roots through which they receive their sustenance. Casing prevents the surface of the compost layer from drying out. This is particularly critical because it is extremely tricky to replace the moisture in the compost layer without killing the spawn at that level. Vegetative mycelium is encouraged to fruit when it enters a medium devoid of, or at least, deficient in nutrients. It attempts to ensure its survival and propagation by producing fruit containing spores. A suitable casing material must therefore, of necessity, be relatively free of nutrients.

Another factor which appears to stimulate fruiting is a sudden reduction in ambient temperature. The casing layer loses its moisture by evaporation, a surface phenomenon, which in turn brings about a temperature drop at the surface of the casing layer. Each watering thus produces a cool layer which brings about a sudden reduction in temperature and is believed to shock the warmth loving mycelium into productive activity. The choice of the casing material and the moisture retaining quality of the casing material are thus critical factors in the regulated growth of a mushroom crop.

In the mushroom growing industry typically, peat, a mixture of soil and peat, or a mixture of sand and peat, have been widely used as casing material. The casing material is first saturated with water and then applied to the growth beds over the compost layers to a thickness of about 1 to 1½ inches. The peat is kept wet thereafter by frequent watering, usually every other day. These prior art casing materials however present a number of problems. This type of casing often produces a "dirty" mushroom, with brown specks which are difficult to remove without bruising the mushroom and which also affect the marketability of the mushroom crop. In addition, the peat must be watered carefully and frequently every other day, which results in soaring operation and production costs. The high water content resulting from frequent watering, which is applied by misting, acts as a disease carrier from cap to cap or from plant to plant. Two common diseases infecting mushrooms and attributable to frequent watering are (1) the bacterial blotch which manifests itself as circular or irregular yellowish spots at or near the margin of the cap and (2) verticillium (dry/wet bubbles) which appears as small white misshapen masses of tissue with swollen stalks and which renders the mushroom unsaleable.

These and other synthetic and/or natural formulations for application as casing material which would ensure a healthy, blemish-free mushroom crop have so far been unsuccessful.

SUMMARY OF THE INVENTION

The subject invention provides an improved composition of matter for use as a casing layer over the compost layer in mushroom growing beds. The composition of the subject invention affords the following advantages over casing material heretofore used:

a. it absorbs water quickly and releases it slowly;
b. it allows watering without sealing off the compost layer;

c. it has a texture and structure that are not markedly altered by watering;

d. it is slightly alkaline and maintains a substantially constant pH over a narrow range for optimum mushroom growth;

e. it is free from disease carrying organisms and insects; and f. it is relatively free of nutrients and undecomposed vegetable matter which are susceptible to attack by undesirable mold and bacteria.

The composition of the subject invention includes a casing substrate selected from materials such as Canadian peat moss, sphagnum peat, sand, clay, loam, and the like, encased within a hydrophilic, thermosetting organic prepolymer resin matrix, polymerizable into a cellular, elastomeric structure. The casing substrate is mixed with the prepolymer resin along with other optional additives such as stabilizers, polymerization initiators and water and is then allowed to cure at an elevated temperature for about 2 to 10 minutes. The resultant mixture is pulverized, as by extrusion through an ⅛ inch aperture, and thereafter used as a casing layer. The hydrophilic characteristics of the resultant mixture, which is used as the casing layer, help in the retention of moisture for longer periods of time so that the mushrooms need be watered less frequently, thus lessening the transmission of disease caused by frequent watering.

A further advantage offered by the present composition which imparts hydrophilic characteristics to the casing mixture, is that watering frequency is significantly reduced, on the order of 3½ times or more, so that the production costs associated with watering are correspondingly reduced by about the same amount.

Another aspect of this invention provides an improved mushroom growing process utilizing the compositions for casing material heretofore disclosed. According to this aspect of the invention, the casing material is layered over the compost bed containing mushroom spores. Mushrooms appear on the beds at intervals of about 7 to 10 days. Each such fresh crop is termed a "flush", and there are about 5 progressively decreasing flushes in a full crop lasting about 7 to 8 weeks. When the subject composition is used as the casing layer, the beds are watered approximately every 7 or 8 days and immediately following the harvesting of each flush of mushrooms, as opposed to watering every other day with the use of prior art casing materials. This eliminates mushroom caps getting water-logged. This type of controlled watering not only increases the quality and the cosmetic value of the mushroom crop, but also arrests the spread of disease which is often carried from cap to cap or from plant to plant through the misting water. The danger of overwatering which also kills the spawn by "drowning" is eliminated.

This process offers an additional advantage in that the mushroom plants are not only minimally exposed to disease carrying watering, but when the casing substrate enclosed in the polymer binder is used as the casing layer in mushroom growth, the process also prevents the dirty brown specks usually found on mushrooms. Mushrooms instead sprout as large clean white caps with extremely high marketable value.

The following detailed description and the accompanying drawings provide a further understanding of the nature and advantages of the subject compositions and processes.

BRIEF DESCRIPTION OF THE DRAWINGS

FIG. 1a is a perspective view of the mushroom growing beds stacked about 8 to 10 high;

FIG. 1b illustrates a sectional view of a flat mushroom bed, showing the compost layer containing the mushroom mycelium, and the casing layer through which the mycelium winds its way to fruit at the surface;

FIG. 2 is a block diagram representing sequentially the various stages of mushroom cultivation; and FIG. 3a is a graphic representation of the mushroom crop cycle from the time of spawning to the end of the crop, consisting of about 5 progressively decreasing flushes, with watering intervals of 1 to 2 days;

FIG. 3b illustrates the same crop cycle with 7-8 day watering intervals when the subject composition is used as the casing layer.

DESCRIPTION OF THE PREFERRED EMBODIMENTS

FIG. 1a illustrates mushroom growing beds widely used in the industry. These consist of flat trays 1, approximately 4 feet wide, 8 feet long, and about 10 inches deep. These flat trays are stacked 8 to 10 high in the mushroom houses. It is of great importance that the mushroom houses be well ventilated and carefully climate controlled. Various methods for controlling the climate within the mushroom houses are known to those skilled in the art.

FIG. 1b illustrates one of the flat trays 1, with a section cut off to expose the compost layer 2, containing the mushroom spores 3, the mycelium 4, the casing layer 5, through which the mycelium makes its way to the surface, and the fruiting mushroom 6.

FIG. 2 is a block diagram showing the various stages of mushroom cultivation from preparing the compost for the growth beds to the final harvesting of the mature mushroom crop.

Block 7 represents the preparation of natural or synthetic compost, consisting normally of wheat straw and horse manure, by methods normally known and used in the industry. Block 8 is representative of the process of mixing the mushroom spores with the compost, and block 9 illustrates the filling of flat trays or beds 1, to a depth of 8-10 inches with the spore-containing compost. Alternatively, if block spawn is used for implantation, the beds are implanted after being filled with the compost. Block 10 represents the spawning of the spores (or spreading of spawn if spawn is used as the starting material), when the beds are ready for the casing or capping, usually about 7-8 days. Block 11 shows the stage where a casing composition is layered to a depth of 1-1½ inches, over the compost layer carrying the mushroom mycelium. The casing layer is then watered, generally every other day when prior art casing compositions are used. Block 12 illustrates the appearance of the mushroom caps in about 15-16 days following sporing or spawning the beds and block 13 is illustrative of the final stage of harvesting the mature, fruited mushroom.

FIG. 3 illustrates the progress of the mushroom crop cycle from the time the flat compost beds are implanted with spores or spawn to the final harvesting of the mushroom cap, through the normal 5 flushes. Time in days is shown on the abscissa and mushroom growth on the ordinate. Numbers 14-35 in FIG. 3a exemplify the watering frequency in prior art methods of every other day and a total of about 21 or 22 watering operations, in the course of the 7 or 8 weeks of mushroom productivity from a single crop. Nos. 19, 23, 26, 30 and 34 indicate the points in time when five mushroom flushes are harvested.

FIG. 3b illustrates the same watering operation but with the use of the subject composition as the casing layer. It should be noted that the watering frequency, to maintain the same amount of moisture in the beds, is dramatically reduced as shown by numbers 38, 40, 42 and 44 which indicate the points in time on the abscissa, when the beds are watered. In the course of the five flushes 36, 39, 41, 43 and 45, the beds are watered 4 times at points 38, 40, 42 an 45, as against a total of 21 or 22 watering operations when prior art casing compositions are used. There is thus a reduction in the watering frequency by a factor of 3 or more.

As stated earlier, mushrooms grow in flushes, a flush appearing approximately every 7 or 8 days. The quality and quantity of the mushroom crop progressively diminishes with each flush. Mushrooms picked after the third flush are usually discarded or ground up with the soil and used as manure.

The composition of the subject invention consists of a slurry, prepared from a mixture of casing substrate, a prepolymer resin, water and other optional additives, which is then allowed to cure at elevated temperatures until the mixture sets to a spongy block. The block is then pulverized, usually by extrusion through apertures, preferably ⅛ inch, and used as a casing layer over the compost layer in mushroom growth beds. Materials suitable for use as the casing substrate in the practice of the subject invention are Canadian peat, sphagnum peat, loam, soil, straw, sand, Vermiculite, Perlite, styrofoam particles and the like, or any combination of natural and/or synthetic soils which exhibits water retention qualities. Suitable for the preparation of the polymeric material in the practice of the subject invention are those prepolymer resins which produce open celled, elastomeric hydrophilic, foam structures. The major classes of non-phytotoxic resins which are particularly suitable are polyurethanes, epoxy foams, rubbers, vinyl foams and polyesters and include all hydrophilic foamable resins. The foam structures are for the most part stable, water insoluble and hydrophilic. Preferred compounds include polyisocyanates, polyurethanes, polyamides, polyols and the like. Particularly preferable are the polyisocyanates and polyurethanes. The various types of resins which are suitable for use in the subject compositions are described in U.S. Pat. Nos. 3,373,009 and 3,805,532 and are incorporated herein by reference. There are a number of other publications and patents dealing with methods of consolidating aggregate soil material to provide an improved, nutrient rich, growth medium for higher order plants and which also serve as support media for transplantation purposes. These, however, are not particularly relevant to the subject invention.

In order to increase the stability, ion exchange and pH buffering capacity of the casing material, other additives and stabilizers are optionally included. The inclusion of an ethylene oxide polymer, particularly Viterra (Union Carbide) or a carbohydrate or a polysaccharide, particularly, guar gum (a polysaccharide made up of mannose and galactose units), increases the water retention capacity of the mixture and apparently prevents friction loss during the extrusion process.

The composition of the present invention consists of about 70 to 95 weight percent of the casing substrate such as Canadian peat moss, about 0.001 to 0.010 weight percent of a buffering agent such as any variety of lime for example calcium hydroxide, quick lime, slaked lime, or Dolomite, about 5 to 50 weight percent of a hyrophilic cellular polymerizable organic prepolymer resin, about 0.2 to 1.0 weight percent of a stabilizer and polymerization initiator and sufficient amount of water, to form a thick slurry having the consistency of cake batter. The ratio of substrate to resin is generally in the range of about 9:1 to about 6:4, more preferably a ratio of about 8:2.

In preparing the composition of the subject invention, 70 to 95 weight percent, preferably 80 to 95 percent, more preferably 85 to 95 percent of the casing substrate, preferably Canadian peat, about 5 to 50 weight percent, preferably 10 to 25 weight percent, more preferably 8 to 15 weight percent on a dry basis, of the foam forming prepolymer resin, about 0.001 to 0.010 weight percent, more preferably 0.005 to 0.010 weight percent of lime, preferably Dolomitic lime, about 0.2 to 1.0 weight percent, more preferably about 0.1 to 0.5 weight percent of a polyethylene oxide or a polysaccharide stabilizer, preferably Viterra (Union Carbide) and optionally, small quantities of other additives such as stabilizers and promoters are initially dispersed in an approximately equal amount by weight of water to make a thick slurry having the consistency of cake batter. The ratio of water to resin is in the range of about 8:1 to about 1:1, preferably 2:1, more preferably 1:1. The foam forming prepolymer resin solution, in the range of about 5 to 30 percent by weight, preferably 10 to 25 weight percent, more preferably 8 to 15 weight percent on a dry basis, is then added and mixed together. The temperature of the reaction mixture is maintained in the range of about 50° F. to 180° F., preferably 80 to 180° F., more preferably 110° to 140° F., still more preferably 120° F. to 130° F. The mixture is then poured into a mold which is preferably open at one end and closed at the other but may be a continuous sheet and cured for about 2 to 10 minutes, preferably about 5 minutes. The mold is precoated with a resin releasing agent such as lecithin, grease or the like or any combination thereof. The cured polymer substrate block is then pulverized by any suitable means but more usually by extrusion through a meat grinder, with preferably ⅛th inch apertures and used as the casing materials over the compost layer.

The following examples are offered by way of illustration and are not to be construed to limit the scope of the invention in any way.

Example 1

A casing composition was prepared as follows:

| | |
|---|---|
| Substantially undecomposed Canadian peat moss | 4,000 grams |
| Dolomitic lime | 20 grams |
| Viterra (polyethylene oxide as the active ingredient) | 20 grams |
| Water | 4,000 grams |

The above ingredients were thoroughly mixed together and incorporated into a slurry with about 325 ml of a polyurethane resin forming prepolymer solution, available under the trademark "Hypol" sold by W. R. Grace and Company, maintaining the temperature at about 120° F. The slurry was then poured into molds approximately 24 inches by 18 inches by 3 inches whose inside surfaces were coated with lecithin or any kind of a grease and allowed to cure to thermosetting, spongy blocks for about 3 to 5 minutes. The blocks of polymer casing thus formed were then pulverized by extrusion through ⅛th inch apertures and used as casing material over the compost layer in mushroom growing beds.

Example 2

A casing composition was prepared as follows using the procedure of Example 1.

| Canadian Sphagnum | ~217 lbs |
| Water | ~130 gals |
| Viterra (Union Carbide) | ~6 lbs |
| Dolomite | ~5.95 lbs |
| Hypol | ~12.7 gals |

This composition was found to be highly suitable as casing material for mushroom growth.

Example 3

A casing composition prepared as in Example 1 above but with Canadian peat substituted by a 4:1 ratio of Canadian peat and Vermiculite. The resultant casing composition exhibits all the qualities of the composition of Example 1.

Example 4

The procedure of Example 1 but with the Canadian peat replaced by the same quantity of ground sphagnum. This composition also exhibits the same desirable qualities of the composition of Examples 1 and 2 above.

Example 5

The procedure of Example 1 but with the "Hypol" prepolymer replaced by a similar polyurethane resin prepolymer available under the trademark "XB-2382", markered by 3M Company. The "XB-2382" prepolymer is usually contituted in an acetone solvent mixture. The presence of even very small quantities of acetone are toxic to the mushroom and kills the mushroom spawn and may not therefore be conducive to the cultivation of a good crop of mushrooms.

Example 6

The procedure of Example 1 but replacing Canadian peat with mixtures of ground styrofoam and peat or mixture of equal parts of loam and peat or a mixture of loam and Vermiculite or the like. Although all these compositions are suitable for use as casing layers, Canadian peat or Canadian peat-Vermiculite mixture are preferable in terms of the quality of the mushroom crop produced. The mushrooms grown with the Canadian peat or peat Vermiculite mixtures incorporated into the polymer resin produces cleaner, whiter, disease-free mushrooms.

The above compositions exhibit all the advantages heretofore enumerated, namely (a) absorb water quickly and release it slowly; (b) allow watering every 7 or 8 days without sealing off the compost layer; (c) exhibit a texture and structure that are not markedly altered by the watering process; (d) slightly alkaline in the pH range of 7.2 to 7.4; (e) are free from disease organisms and insects, and (f) are relatively free from nutrients and undecomposed vegetable matters such that neither the mycelium nor any undesirable mold and bacteria can utilize the nutrients present which in turn retard the development of a full crop of desirable mushrooms. The above compositions when used as casing material possess sufficient water porosity and water retention qualities, that watering of the mushroom beds need to be carried out only every 7 or 8 days and in between flushes in order to maintain a constant amount of moisture. The casing compositions also prevent dirty specks on the mushroom fruit and the spread of disease.

It is also found during the experiments that when the casing formulations described above are used in a block form as the casing layer, regardless of the material used, the mushroom mycelium is unable to penetrate the compactly bound, reticulated polymer matrix and is thus suffocated. However, when the material is used in a pulverized form, the mycelium threads are able to wind their way to the surface through and between the polymer particles. It is thus discovered that by controlling the particle size, the spacing between fruiting mushrooms may be varied at will thereby regulating the size of the fruiting mushroom caps.

In summary, it can be seen that the present invention provides novel compositions and processes for use as casing material in the cultivation of mushrooms which exhibit qualities not achieved in prior art formulations. While the above description provides a full and complete disclosure of the preferred embodiments of the invention, it becomes obvious that various modifications, alternative constructions, equivalents and improvements may be practiced without departing from the true spirit and scope of the invention and of the appended claims. Accordingly, the above description and illustrations should not be construed as limiting the scope of the invention as defined by the appended claims.

What is claimed is:

1. In a process for the cultivation of mushrooms, consisting of the steps of preparing the beds by filling them with a pre-prepared compost composition, to a depth of about 8 to 10 inches; mixing with said compost, selected mushroom spores; casing or capping the beds after 7 to 8 days with a suitable capping material; and watering said mushroom beds every other day; the improvement which comprises the steps of: (a) using as the casing material a composition comprising a foam forming, hydrophilic, synthetic, organic prepolymer resin; a casing substrate; a buffering agent; and water in sufficient quantities to form a slurry and (b) watering said mushroom beds every 7 or 8 days.

2. A process as recited in claim 1, wherein said casing substrate is Canadian peat.

3. A process as recited in claim 1, wherein said casing substrate is sphagnum moss.

4. A process as recited in claim 1 wherein said casing substrate is a mixture of peat and vermiculite.

5. A process as recited in claim 4 wherein said peat and Vermiculite are in a ratio of about 4 to 1.

6. A process as recited in claim 1, wherein said prepolymer is a polyurethane resin.

7. A process as recited in claim 1, wherein said prepolymer resin is a reaction product of toluene diisocyanate with a polyester having unreacted hydroxyl groups thereon and water.

8. A process as recited in claim 7 wherein said casing substrate and said prepolymer resin are in a ratio of about 9 to 1.

9. A process as recited in claim 7, wherein said casing matrix and said prepolymer resin are in a ratio of about 8 to 2.

10. A process as recited in claim 8 or 9, wherein said buffering agent is selected from a group consisting of Dolomitic lime, quick lime, slaked lime and calcium hydroxide.

11. A process as recited in claim 1, wherein a stabilizer is included.

12. A process as recited in claim 1, wherein said stabilizer is a hydrophilic polymer.

13. A process as recited in claim 12, wherein said hydrophilic polymer is a polysaccharide.

14. A process as recited in claim 13, wherein said polysaccharide is a guar gum.

15. A process as recited in claim 12, wherein said hydrophilic polymer is polyethylene oxide.

16. A process as recited in claim 11, wherein the ratio of said water to said prepolymer resin is in the range of about 1 to 1 to about 8 to 1.

17. A process as recited in claim 15, wherein the ratio of said water to said prepolymer resin is about 1 to 1.

* * * * *